United States Patent
Kairali et al.

(10) Patent No.: US 12,549,486 B2
(45) Date of Patent: Feb. 10, 2026

(54) OPTIMIZING NETWORK BANDWIDTH AVAILABILITY

(71) Applicant: International Business Machines Corporation, Armonk, NY (US)

(72) Inventors: Sudheesh S. Kairali, Kozhikode (IN); Satyam Jakkula, Bengaluru (IN); Sarbajit K. Rakshit, Kolkata (IN); Sudhanshu Sekher Sar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 18/046,991

(22) Filed: Oct. 17, 2022

(65) Prior Publication Data

US 2024/0129243 A1    Apr. 18, 2024

(51) Int. Cl.
*H04L 47/127* (2022.01)
*H04L 41/0896* (2022.01)
*H04L 47/80* (2022.01)

(52) U.S. Cl.
CPC ........ *H04L 47/127* (2013.01); *H04L 41/0896* (2013.01); *H04L 47/803* (2013.01)

(58) Field of Classification Search
CPC ............................ H04L 47/127; H04L 47/803
USPC ........................................................ 370/235
See application file for complete search history.

(56) References Cited

U.S. PATENT DOCUMENTS

| | | | |
|---|---|---|---|
| 8,452,866 B2 | 5/2013 | Boer et al. | |
| 9,552,550 B2 | 1/2017 | Vasseur et al. | |
| 2023/0342574 A1* | 10/2023 | Kim | ........................ G06K 7/12 |

FOREIGN PATENT DOCUMENTS

| | | | | |
|---|---|---|---|---|
| CN | 111405370 A | * | 7/2020 | ............... H04N 7/18 |
| WO | 2021026481 | | 2/2021 | |

OTHER PUBLICATIONS

Anonymous, "Method and System for Context-Aware Dynamic Allocation of Resources to Batch Jobs Based on Predicted Impact on Breaching SLA." IPCOM000269743D. May 10, 2022. 5 Pages.

(Continued)

*Primary Examiner* — Sibte H Bukhari (57) ABSTRACT

According to an aspect, a computer-implemented method includes identifying applications in a network environment that perform periodic data extraction and data transmission operations and identifying a frequency and a data transmission load for each of the operations. Aspects also include predicting an available bandwidth in the network environment based at least in part on the periodic data extraction and data transmission operations and based on a determination that the available bandwidth in the network environment will fall below a threshold value during a time interval instructing the applications to modify the one or more of the periodic data extraction and data transmission operations to increase the frequency associated with the one or more of the periodic data extraction and data transmission operations.

20 Claims, 4 Drawing Sheets

(56) References Cited

OTHER PUBLICATIONS

Anonymous, "Method and System for Proactive Resource Allocation Based on Dependencies Among Resource Consumption Points to Optimize Processing Time." IPCOM000269293D. Apr. 1, 2022. 6 Pages.

M. Louvel et al. "A Network Resource Management Framework for Multimedia Applications Distributed in Heterogeneous Home Networks." https://www.researchgate.net/publication/221192110. Mar. 2011. 9 Pages.

* cited by examiner

OPTIMIZING NETWORK BANDWIDTH AVAILABILITY

BACKGROUND

The present invention generally relates to computer systems, and more specifically, to computer systems, computer-implemented methods, and computer program products for optimizing network bandwidth availability.

In general, computing systems include a large number of different components that interact with each other in multiple ways. These components include hardware devices, applications, network elements, and the like. Computing systems often include one or more applications that collect various types of data that are stored locally and then periodically provided to another computing system via a network in a scheduled batch data transfer. Such batch data transfers can lead to large increases in the bandwidth of the network being consumed, which can negatively impact the execution of other network traffic. In addition, such large batch data transfers may cause systems administrators to over-provision a network environment to maintain a minimum amount of available network bandwidth.

SUMMARY

Embodiments of the present invention are directed to a method for optimizing network bandwidth availability. According to an aspect, a computer-implemented method includes identifying applications in a network environment that perform periodic data extraction and data transmission operations and identifying a frequency and a data transmission load for each of the periodic data extraction and data transmission operations. The method also includes predicting an available bandwidth in the network environment based at least in part on the periodic data extraction and data transmission operations. Based on a determination that the available bandwidth in the network environment will fall below a threshold value during a time interval, the method includes identifying one or more of the periodic data extraction and data transmission operations scheduled to execute during the time interval and instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations. Increasing the frequency associated with the one or more of the periodic data extraction and data transmission operations reduces the data transmission load of the one or more of the periodic data extraction and data transmission operations.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

As discussed above, computing systems often include applications that perform batch data transfer jobs that consume large amounts of network bandwidth. These applications often collect or extract data and then periodically execute a bulk transfer of the accumulated data. In exemplary embodiments, the network bandwidth availability is optimized by identifying applications that perform batch data transfer operations in a network environment and instructing the application to increase the frequency of the batch data transfer operations. By increasing the frequency of the batch data transfer operations, the impact that the batch data transfer operations have on the availability of network bandwidth can be reduced and the overall utilization of the network can be improved.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
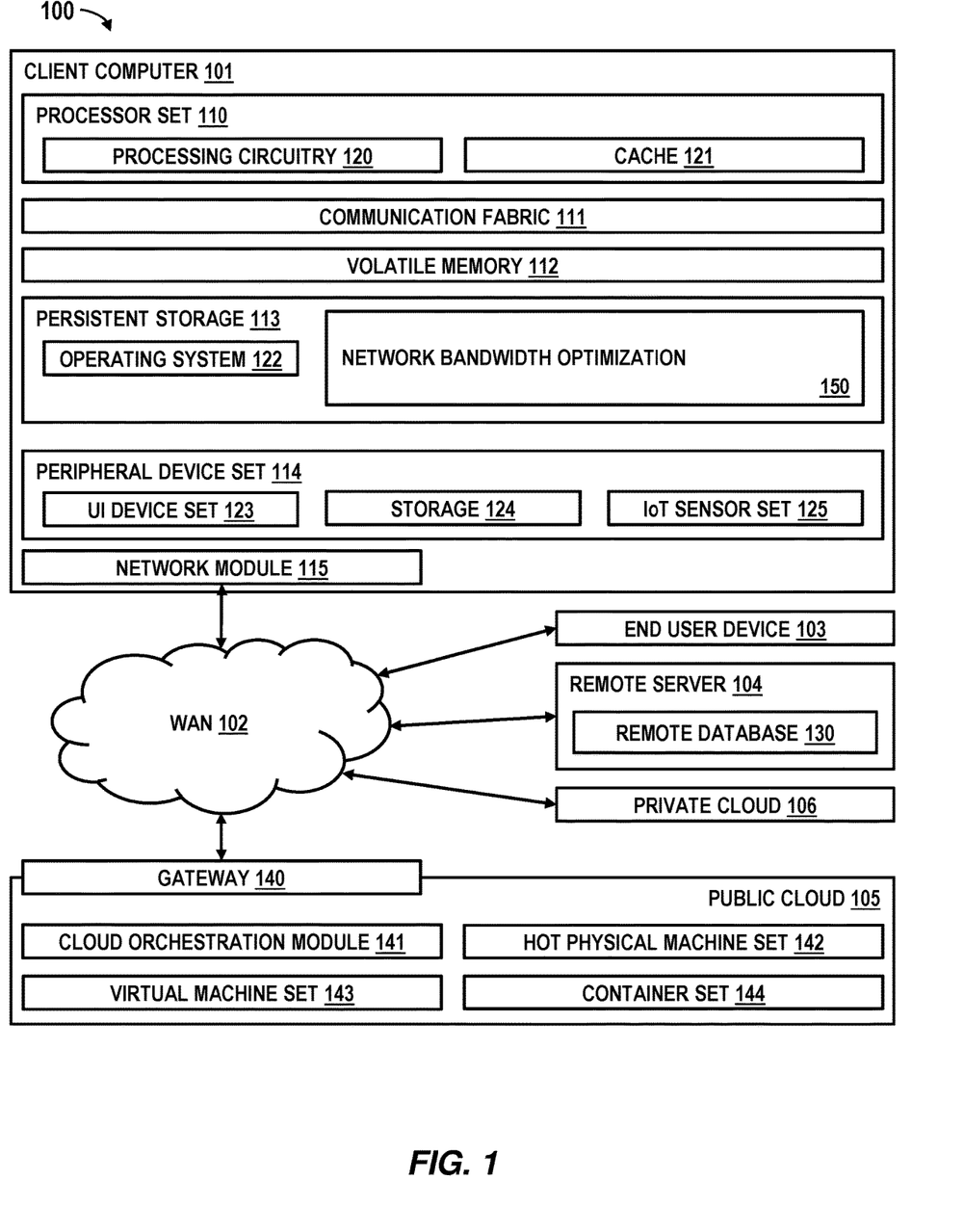
FIG. 1 depicts a block diagram of an example computer system for use in conjunction with one or more embodiments of the present invention.

Computing environment 100 contains an example of an environment for the execution of at least some of the computer code involved in performing the inventive methods, such as the optimization of network bandwidth availability 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
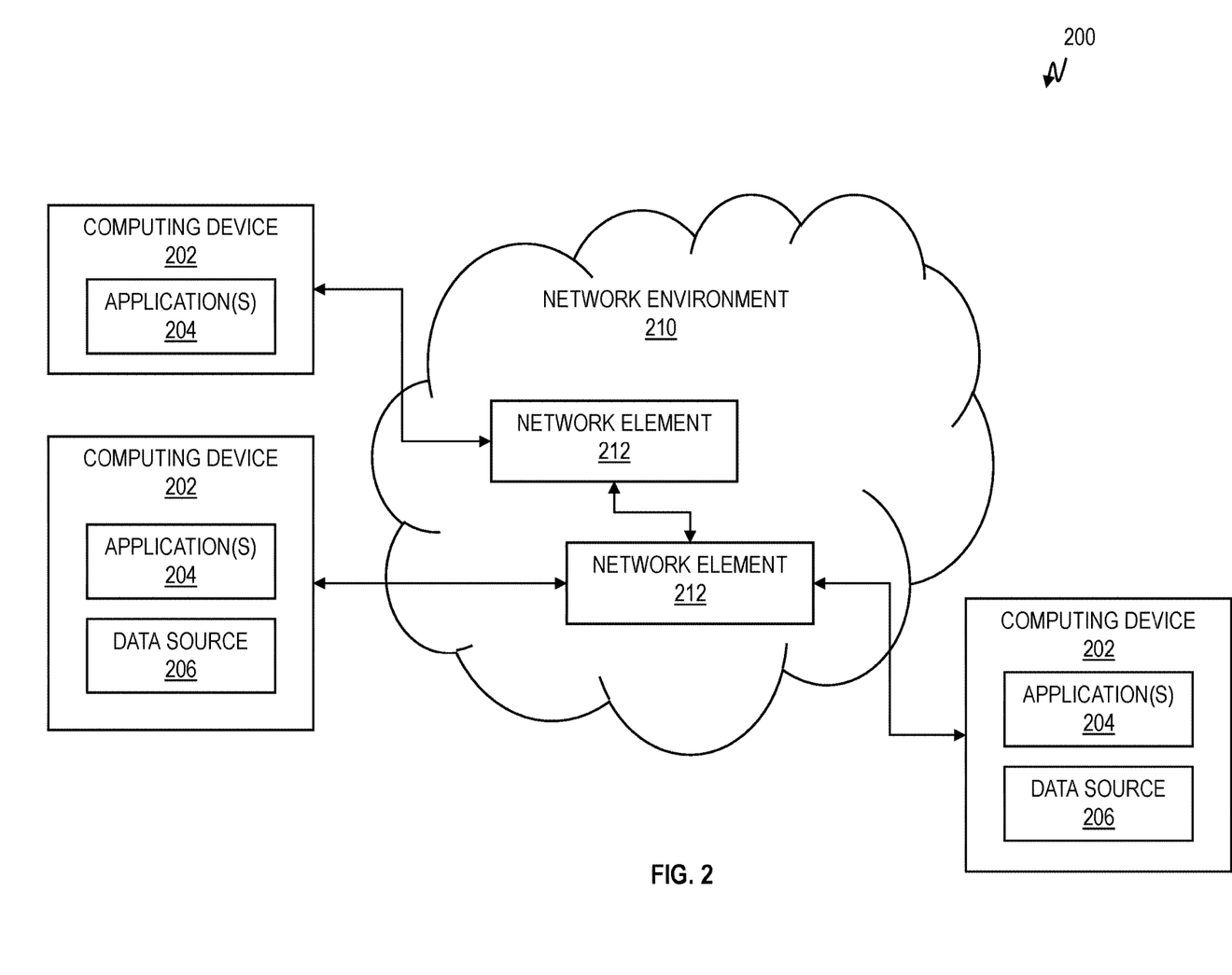
FIG. 2 is a block diagram of a system for use in conjunction with one or more embodiments of the present invention.

Referring now to FIG. 2, a block diagram of a system 200 for use in conjunction with one or more embodiments of the present invention is shown. In exemplary embodiments, the system 200 includes a plurality of computing devices 202 that applications 204 and optionally data sources 206. In exemplary embodiments, the computing systems 202 may be a personal computer, a mobile device, a computer 101 as shown in FIG. 1, or the like. In exemplary embodiments, the data sources 206 can include one or more pieces of hardware and/or one or more pieces of software. The system 200 also includes a network environment 210 that includes one or more network elements 212. In exemplary embodiments, the network environment 210 may be a private cloud 106 or a public cloud 105, such as the ones shown in FIG. 1.

In exemplary embodiments, one of the network elements 212 is a computer 101, as shown in FIG. 1, that is configured to monitor an available bandwidth in the network environment 210. The network element 212 is further configured to obtain execution logs from the applications 204 and to correlate the monitored available bandwidth in the network environment 210 with the operations executed by the applications. In exemplary embodiments, the network element 212 is configured to use machine learning to identify periodic data extraction and data transmission operations performed by the applications 204 and to identify frequency and data transmission load for each of the identified periodic data extraction and data transmission operations.

In exemplary embodiments, one of the network elements 212 is further configured to predict the availability of network bandwidth in the network environment 210 based at least in part on the expected periodic data extraction and data transmission operations. Based on a determination that the availability of network bandwidth of the network environment 210 will be below a minimum threshold level, the network element 212 is configured to instruct one or more of the applications to increase the frequency of their periodic data extraction and data transmission operations. By increasing the frequency of periodic data extraction and data transmission operation, the amount of data that is accumulated and therefore transmitted across the network environment 210 is reduced.

In exemplary embodiments, each application 204 may have an associated service level agreement (SLA) that governs the periodic data extraction and data transmission operations performed by the application. The SLA includes a required timing for the execution of the data extraction and transmission by the application 204. In exemplary embodiments, the SLA includes a minimum and a maximum frequency that the data extraction and data transmission operations can be performed and the SLA is provided to the network element 212 by the application 204.

Figure 3:
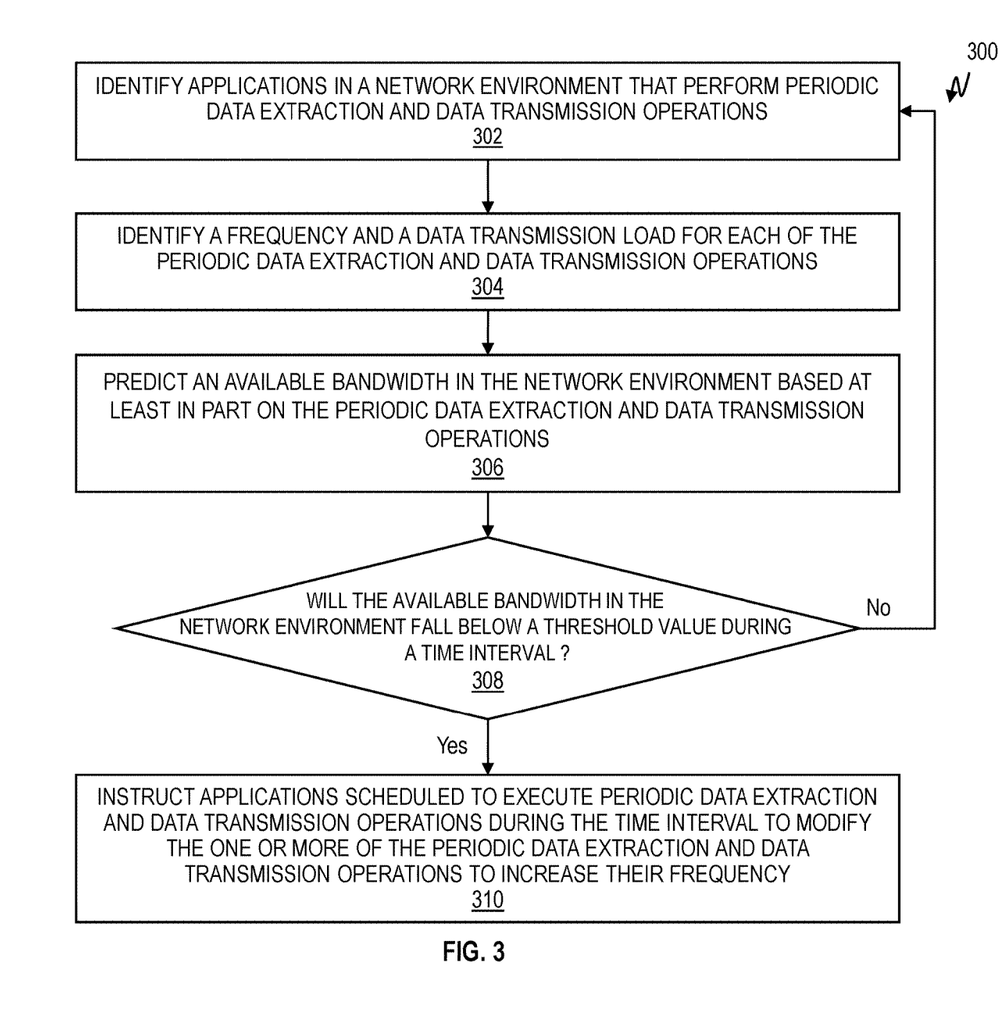
FIG. 3 is a flowchart of a method for optimizing network bandwidth availability in accordance with one or more embodiments of the present invention.

Referring now to FIG. 3, a flowchart of a method 300 for optimizing network bandwidth availability in accordance with one or more embodiments of the present invention is shown. In exemplary embodiments, the method 300 is performed by a network element 212 of the networking environment 210 as shown in FIG. 2. The method 300 includes identifying applications in a network environment that perform periodic data extraction and data transmission operations. In exemplary embodiments, the applications and operations are identified by analyzing one or more logs obtained from the applications. Next, as shown at block 302, the method 300 includes identifying a frequency and a data transmission load for each of the periodic data extraction and data transmission operations. The frequency and the data transmission load for each of the periodic data extraction and data transmission operations are identified by analyzing log files associated with the applications. As used herein, the frequency of a periodic data extraction and data transmission operation is how often the operation transmits data over a network environment and the data transmission load is an average amount of data that the operation transmits data over the network environment.

The method 300 also includes predicting an available bandwidth in the network environment based at least in part on the periodic data extraction and data transmission operations, as shown at block 306. In exemplary embodiments, the available bandwidth in the network environment is further based on the historical usage of the network environment. Next, as shown at decision block 308, the method 300 includes determining whether the available bandwidth in the network environment will fall below a threshold value during a time interval. In one embodiment, the threshold value is a minimum percentage of network availability set by a systems administrator.

Based on a determination that the available bandwidth in the network environment will fall below the threshold value during the time interval, the method 300 proceeds to block 310 and instructs one or more applications scheduled to execute periodic data extraction and data transmission operations during the time interval to modify the one or more of the periodic data extraction and data transmission operations to increase their frequency. In exemplary embodiments, increasing the frequency of the periodic data extraction and data transmission operations reduces the data transmission load of the periodic data extraction and data transmission operations.

In exemplary embodiments, once it is determined that the available bandwidth in the network environment will fall below the threshold value during the time interval, the method includes identifying one or more of the periodic data extraction and data transmission operations scheduled to execute during the time interval that are able to have their frequency increased. In exemplary embodiments, the determination that an application can have the frequency of its periodic data extraction and data transmission operations increased is based on a service level agreement associated with the application, which specifics both a minimum and maximum allowable frequency for the periodic data extraction and data transmission operations of the application.

In exemplary embodiments, each of the applications and/or periodic data extraction and data transmission operations include a priority level that can be set by a system administrator or by a user of one of the computing devices. The priority level may be used by the network element to identify which periodic data extraction and data transmission operations should have their frequency modified. For example, applications may be ranked by their assigned priority level and adjustments to the frequency of their periodic data extraction and data transmission operations are made such that lower ranked applications have their frequency modified before higher ranked applications.

Figure 4:
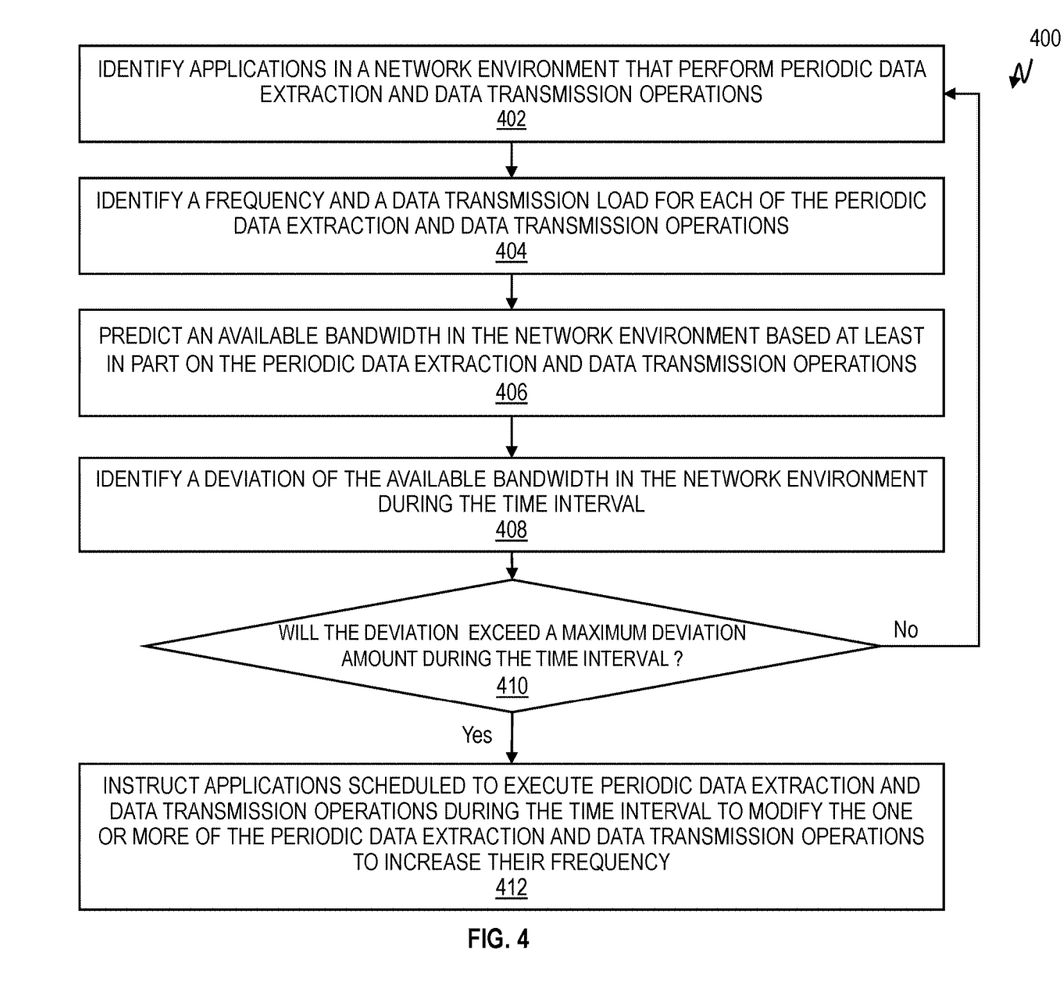
FIG. 4 is a flowchart of another method for optimizing network bandwidth availability in accordance with one or more embodiments of the present invention.

Referring now to FIG. 4, a flowchart of a method 400 for optimizing network bandwidth availability in accordance with one or more embodiments of the present invention is shown. In exemplary embodiments, the method 400 is performed by a network element 212 of the networking environment 210 as shown in FIG. 2. The method 400 includes identifying applications in a network environment that perform periodic data extraction and data transmission operations. In exemplary embodiments, the applications and operations are identified by analyzing one or more logs obtained from the applications. Next, as shown at block 402, the method 400 includes identifying a frequency and a data transmission load for each of the periodic data extraction and data transmission operations. The frequency and the data transmission load for each of the periodic data extraction and data transmission operations are identified by analyzing log files associated with the applications.

The method 400 also includes predicting an available bandwidth in the network environment based at least in part on the periodic data extraction and data transmission operations, as shown at block 406. In exemplary embodiments, the available bandwidth in the network environment is further based on a historical usage of the network environment. Next, as shown at block 408, the method 400 includes identifying a deviation of the available bandwidth in the network environment during the time interval. In one embodiment, identifying the deviation of the available bandwidth in the network environment during the time interval includes determining a difference between a maximum and minimum available bandwidth in the network environment during the time interval. In another embodiment, identifying the deviation of the available bandwidth in the network environment during the time interval includes identifying the expected available bandwidth in the network environment at multiple points during the time interval and calculating a mean available bandwidth and a standard deviation of the available bandwidth during the time interval.

As shown at decision block 410, the method 400 includes determining whether the deviation will exceed a maximum deviation amount during the time interval. Based on a determination that the deviation will exceed a maximum deviation amount during the time interval, the method 400 proceeds to block 412 and instructs one or more applications scheduled to execute the periodic data extraction and data transmission operations during the time interval to modify the one or more of the periodic data extraction and data transmission operations to increase their frequency. In exemplary embodiments, increasing the frequency of the periodic data extraction and data transmission operations reduces the deviation of the available bandwidth in the network environment during the time interval.

In exemplary embodiments, where the network environment is a public or private cloud in which a user pays fees based on the maximum bandwidth used during a time interval, having a high deviation in the available bandwidth leads to users paying larger than necessary usage fees. Accordingly, by increasing the frequency of the periodic data extraction and data transmission operations, the deviation of the available bandwidth in the network environment is decreased, along with the fees for the use of the network environment.

Technical advantages and benefits include methods, systems, and computer program products that optimized an available network bandwidth by identifying batch data processing and transmission operations and modifying the frequency at which these operations execute. By increasing the frequency at batch data processing and transmission operations execute, the amount of data that is transmitted across a network environment for these operations is reduced and spread out across multiple time intervals, which reduced the impact on the available network bandwidth of the batch data processing and transmission operations.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for optimizing network bandwidth availability, the method comprising:
   identifying applications in a network environment that perform periodic data extraction and data transmission operations;
   identifying a frequency and a data transmission load for each of the periodic data extraction and data transmission operations;
   predicting an available bandwidth in the network environment based at least in part on the periodic data extraction and data transmission operations; and
   based on a determination that the available bandwidth in the network environment will fall below a threshold value during a time interval:
   identifying one or more of the periodic data extraction and data transmission operations scheduled to execute during the time interval; and
   instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations,
   wherein increasing the frequency associated with the one or more of the periodic data extraction and data transmission operations reduces the data transmission load of the one or more of the periodic data extraction and data transmission operations.

2. The method of claim 1, wherein the frequency and the data transmission load for each of the periodic data extraction and data transmission operations are identified by analyzing log files associated with the applications.

3. The method of claim 1, wherein the available bandwidth in the network environment is further based on a historical usage of the network environment.

4. The method of claim 1, further comprising obtaining a service level agreement associated with the identified applications and wherein the increase in the frequency is based at least in part on the service level agreement associated with the identified applications.

5. The method of claim 1, wherein the threshold value is a minimum percentage of network availability set by a systems administrator.

6. The method of claim 1, further comprising: identifying a deviation of the available bandwidth in the network environment during the time interval; based on a determination that the deviation of available bandwidth during the time interval is greater than a maximum deviation amount, instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations.

7. The method of claim 6, wherein increasing the frequency associated with the one or more of the periodic data extraction and data transmission operations reduces the deviation of the available bandwidth in the network environment during the time interval.

8. A system comprising:
   a memory having computer readable instructions;
   and one or more processors for executing the computer readable instructions, the computer readable instructions controlling the one or more processors to perform operations comprising:
   identifying applications in a network environment that perform periodic data extraction and data transmission operations;
   identifying a frequency and a data transmission load for each of the periodic data extraction and data transmission operations;
   predicting an available bandwidth in the network environment based at least in part on the periodic data extraction and data transmission operations; and
   based on a determination that the available bandwidth in the network environment will fall below a threshold value during a time interval: identifying one or more of the periodic data extraction and data transmission operations scheduled to execute during the time interval; and
   instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations,
   wherein increasing the frequency associated with the one or more of the periodic data extraction and data transmission operations reduces the data transmission load of the one or more of the periodic data extraction and data transmission operations.

9. The system of claim 8, wherein the frequency and the data transmission load for each of the periodic data extraction and data transmission operations are identified by analyzing log files associated with the applications.

10. The system of claim 8, wherein the available bandwidth in the network environment is further based on a historical usage of the network environment.

11. The system of claim 8, wherein the operations further comprise obtaining a service level agreement associated with the identified applications and wherein the increase in the frequency is based at least in part on the service level agreement associated with the identified applications.

12. The system of claim 8, wherein the threshold value is a minimum percentage of network availability set by a systems administrator.

13. The system of claim 8, wherein the operations further comprise: identifying a deviation of the available bandwidth in the network environment during the time interval; based on a determination that the deviation of available bandwidth during the time interval is greater than a maximum deviation amount, instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations.

14. The system of claim 8, wherein increasing the frequency associated with the one or more of the periodic data extraction and data transmission operations reduces the deviation of the available bandwidth in the network environment during the time interval.

15. A computer program product comprising a computer readable storage medium having program instructions embodied therewith, the program instructions executable by a processor to cause the processor to perform operations comprising:
 identifying applications in a network environment that perform periodic data extraction and data transmission operations;
 identifying a frequency and a data transmission load for each of the periodic data extraction and data transmission operations;
 predicting an available bandwidth in the network environment based at least in part on the periodic data extraction and data transmission operations; and
 based on a determination that the available bandwidth in the network environment will fall below a threshold value during a time interval:
 identifying one or more of the periodic data extraction and data transmission operations scheduled to execute during the time interval; and
 instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations,
 wherein increasing the frequency associated with the one or more of the periodic data extraction and data transmission operations reduces the data transmission load of the one or more of the periodic data extraction and data transmission operations.

16. The computer program product of claim 15, wherein the frequency and the data transmission load for each of the periodic data extraction and data transmission operations are identified by analyzing log files associated with the applications.

17. The computer program product of claim 15, wherein the available bandwidth in the network environment is further based on a historical usage of the network environment.

18. The computer program product of claim 15, wherein the operations further comprise obtaining a service level agreement associated with the identified applications and wherein the increase in the frequency is based at least in part on the service level agreement associated with the identified applications.

19. The computer program product of claim 15, wherein the threshold value is a minimum percentage of network availability set by a systems administrator.

20. The computer program product of claim 15, wherein the operations further comprise: identifying a deviation of the available bandwidth in the network environment during the time interval; based on a determination that the deviation of available bandwidth during the time interval is greater than a maximum deviation amount, instructing the applications scheduled to execute the one or more of the periodic data extraction and data transmission operations during the time interval to modify the one or more of the periodic data extraction and data transmission operations to increase the frequency associated with the one or more of the periodic data extraction and data transmission operations.

\* \* \* \* \*